2,127,920

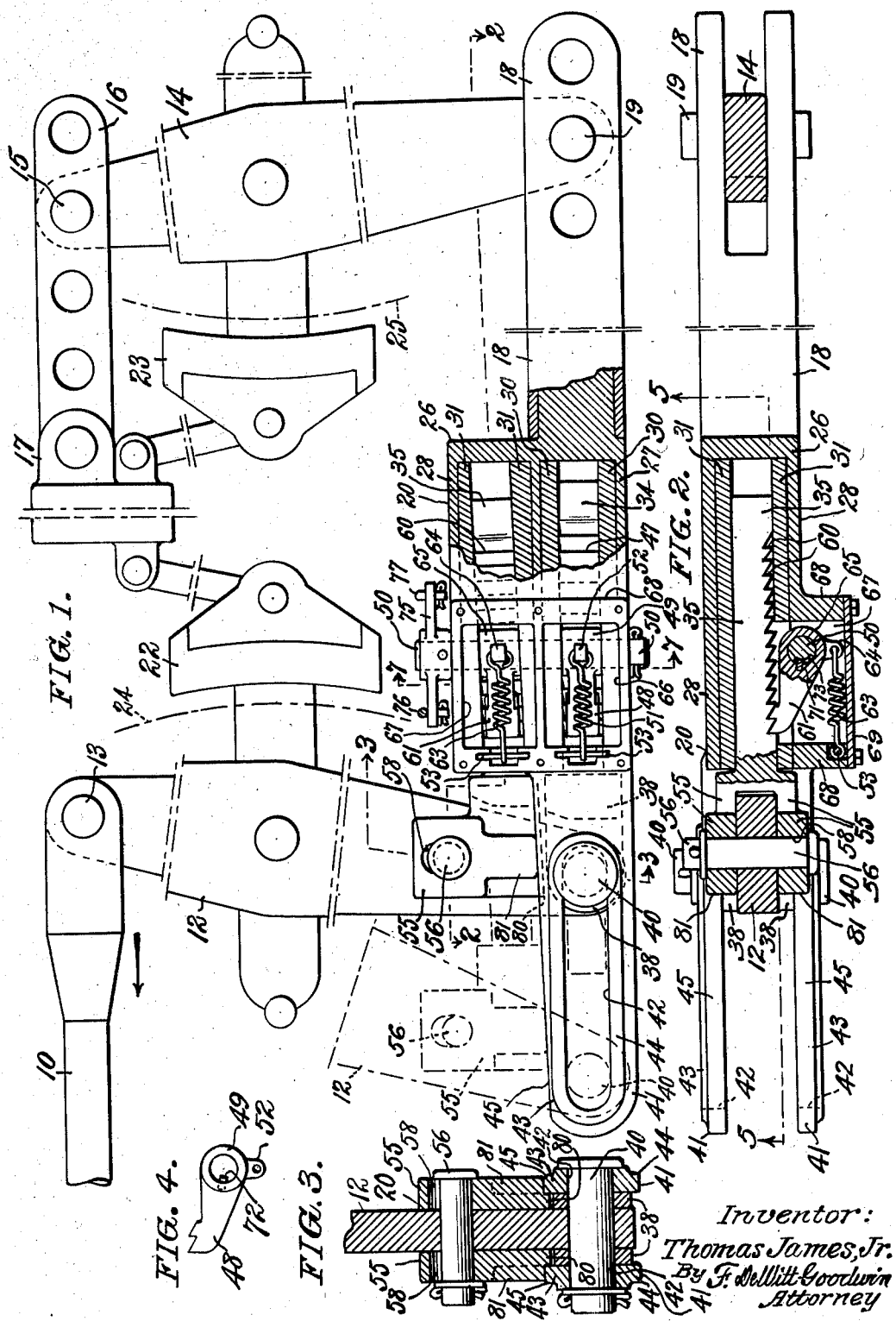
Aug. 23, 1938.   T. JAMES, JR   2,127,920
SLACK ADJUSTER
Filed May 20, 1937   2 Sheets-Sheet 1
Inventor:
Thomas James, Jr.
By F. DeWitt Goodwin
Attorney Aug. 23, 1938.  T. JAMES, JR  2,127,920
SLACK ADJUSTER
Filed May 20, 1937  2 Sheets-Sheet 2
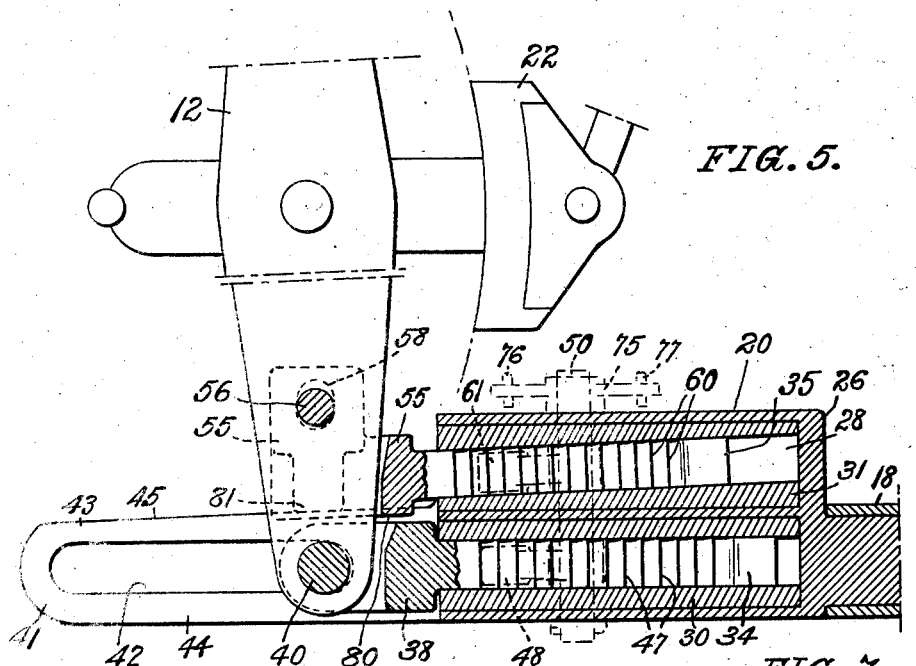
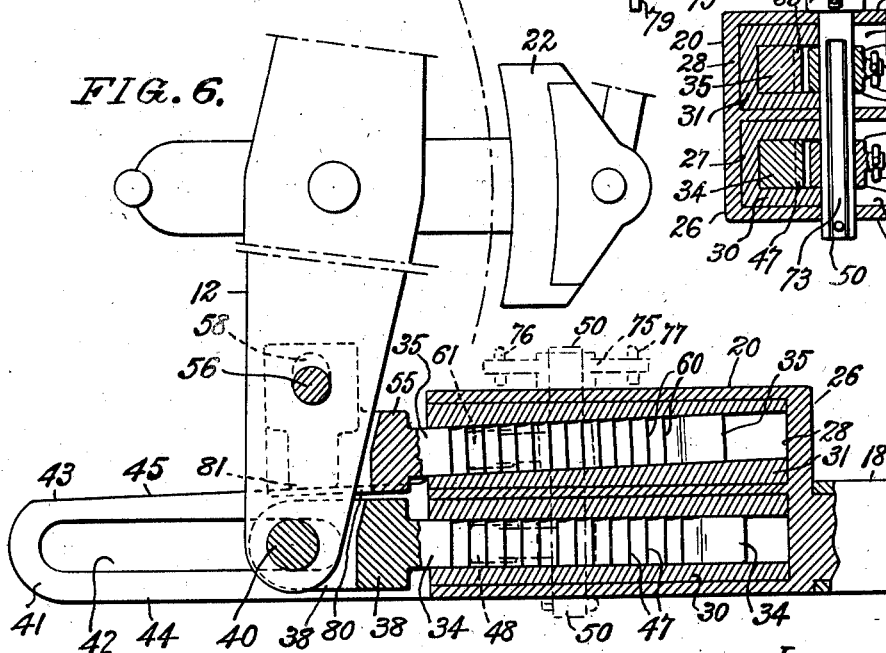
Inventor:
Thomas James, Jr.
By F. DeWitt Goodwin
Attorney Patented Aug. 23, 1938

UNITED STATES PATENT OFFICE 2,127,920

SLACK ADJUSTER

Thomas James, Jr., Oaklyn, N. J., assignor to Universal Slack Adjuster Company, Camden, N. J., a corporation of New Jersey Application May 20, 1937, Serial No. 143,690

11 Claims. (Cl. 188—200)

My invention relates to improvements in automatic slack adjusters for standard brake rigging for railway cars.

The object of my invention is to provide a slack adjuster comprising a spreader having a pair of extension piston rods mounted thereon and pivotally associated with a lever of the brake rigging and means for automatically actuating said rods for taking up slack in the rigging.

A further object is to provide novel means for locking the parts of the slack adjuster in brake release position to insure the parts against any accidental movement which would tend to eliminate the proper clearance between the brake shoes and the wheels.

A further object is to arrange the piston rods for movement with the lever through different distances, and provide the rod having the shorter travel, with ratchet teeth which are relatively closer together than ratchet teeth upon the other of the rods and having a greater travel, whereby the ratchet teeth of each rod will be properly engaged by pawls mounted upon the spreader throughout the various positions of adjustment of the pistons, to maintain the proper angle of the lever in the release position throughout the adjustments of the spreader.

A further object is to provide means for readily unlocking the piston rods from the spreader, including extension operating means which may be actuated from the sides of the car, thus avoiding the necessity of the operator going beneath the car to release the brakes when the worn brake shoes are to be replaced and the adjusting device is to be reset to the starting position.

These together with various other novel construction and arrangement of the parts, which will be more fully hereinafter described and claimed, constitute my invention.

Referring to the drawings:

Fig. 1 is a side elevation, partly in section, of my novel slack adjuster.

Fig. 2 is a horizontal section on line 2—2 Fig. 1.

Fig. 3 is a transverse section on line 3—3 Fig. 1.

Fig. 4 is a plan view of the lower one of the pawls shown in Fig. 1.

Fig. 5 is a vertical longitudinal section on line 5—5 Fig. 2, showing the parts with the brakes applied.

Fig. 6 is a view similar to Fig. 5 showing the parts in the adjusted position.

Fig. 7 is a transverse section on line 7—7 Fig. 1.

Referring to the drawings in which like reference characters refer to like parts, 10 represents the pull rod adapted to be operated by any standard air brake cylinder or any hand brake device, not shown in the drawings. A live lever 12 is pivotally connected by a pin 13 with the rod 10. A dead lever 14 is pivotally connected by a pin 15 with a link 16, which is pivoted upon a fixed bearing 17. The opposite end of the lever 14 is connected with one end of a spreader 18, by a pin 19, and the lever 12 is pivotally associated with the opposite end of the spreader 18 by my novel adjusting device 20.

Brake shoes 22 and 23 are associated with the intermediate portions of said levers and are adapted to be applied to the wheels 24 and 25, indicated by dot and dash lines.

The end of the spreader 18 which is associated with the lever 12 is provided with a housing 26, forming chambers, or cylinders, 27 and 28, which are square in cross section, and having their longitudinal axes extending parallel with the length of the spreader 18.

The cylinders 27 and 28 are provided with bushings 30 and 31 respectively, which are secured within the cylinders by the well known pressing operation. Piston rods 34 and 35, preferably of square cross section, are slidably mounted in the bushings 30 and 31, and are adapted for longitudinal movement relatively to the housing and the spreader 18.

The lower piston rod 34 extends beyond one end of the housing 26 and is provided with a bifurcated head 38 which embraces the free end of the lever 12. Said head 38 is pivotally connected to the lever 12 by a cross-head 40. Guides 41—41 are mounted upon the housing 26 and are provided with longitudinal slots 42—42, in which the cross-head 40 is slidably mounted.

The guides 41—41 comprise upper guide bars 43—43 and lower bars 44—44. The top bearing surfaces 45—45 of the upper bars 43—43 are inclined for purposes hereinafter described.

The lower piston rod 34 is provided with teeth 47, forming a rack upon one vertical face thereof. A pawl 48 is located within the housing 26 and has a hub 49 which is rotatably mounted upon a pin 50, which in turn is rotatably mounted upon the housing. The pawl 48 is urged into engagement with the teeth 47 of the rack by a spring 51 having one end attached to a lug 52 formed upon the hub 49. The opposite end of the spring is attached to a pin 53 secured upon the housing. The lower rod 34 forms a holding rod and the pawl 48, engageable therewith, forms a holding pawl, and they are adapted for holding the rod 34 and the spreader in fixed relation when the pull rod 10 is moved in the direction of the arrow Fig.

1, for moving the levers 12 and 14 for applying the brakes.

The upper piston rod 35 forms an adjusting rod. It extends beyond the housing 26 and is provided with a bifurcated head 55, which embraces the lever 12, and is pivotally connected with the lever by a fulcrum pin 56. Said head 55 is provided with elongated slots 58—58, which slots extend vertically and are adapted to permit said pin 56 to move vertically relatively to the head 55 when the lever 12 is moved in the direction of the arrow Fig. 1, about the cross-head 40 as a center.

The adjusting piston rod 35 is preferably of square cross-section and is provided with teeth 60, forming a rack upon one vertical face thereof. An adjusting pawl 61 is located within the housing 26 and is engageable with the teeth 60. The pawl 61 is rotatably mounted upon said pivot pin 50, and is urged into engagement with the teeth 60 by a spring 63 attached to a lug 64 on the hub 65 of the pawl 61, and to a pin 53 secured upon the housing.

The pawls 48 and 61 are located in chambers 66 and 67 formed in a side extension 68 of the housing, and are enclosed by a cover 69, detachably secured to said extension 68.

The pin 50, on which the pawls 48 and 61 are mounted, projects beyond the housing and is provided with means for manually releasing the pawls from the racks of the piston rods when it is desired to return the piston rods within the housing to a starting position. As shown in Fig. 2, the hub 65 of the pawl 61 has secured therein a key 71, and the pawl 48, shown in Fig. 4, has a similar key 72.

The pin 50 is provided with a longitudinal keyway 73, as shown in Fig. 7. The keys 71 and 72 occupy the key-way 73, and the latter is of sufficient width to permit the pawls to rotate on the pin 50 so that they can move into and out of the teeth 47 and 60 of the racks of the rods 35 and 36 during the ordinary adjustments of the piston rods.

The pin 50 extends above the housing and has secured thereto a double arm lever 75. Pull rods 76 and 77 are attached to the ends of the opposite lever arms and extend in opposite directions, as shown in Fig. 7. The rods 76 and 77 have handles 78 and 79 which are located adjacent to the opposite sides of the car on which the brake rigging is mounted. By pulling either of said handles the pin 50 will be rotated and engage the keys 71 and 72 and rotate the pawls 48 and 61 out of engagement with the racks of the piston rods 34 and 35 and permit said rods to return into the cylinders of the housing 26, when it is desired to reset the rods for the purpose of renewing the brake shoes 22 and 23.

The teeth 60 of the rack on the adjusting rod 35 are spaced closer together than the teeth 47 of the rack on the holding rod 34, due to the difference in the distances through which the fulcrum pin 56 travels relatively to the cross-head 40 during the movements of the lever 12 for operating the brakes.

During the normal applications of the brakes the lever 12 moves in the direction of the arrow Fig. 1, and rotates about the cross-head as a center. The fulcrum pin 56 withdraws the adjusting piston rod 35 from the housing a distance slightly less than one tooth space of the rack on the rod 35, so that the adjusting pawl 61 does not engage a new tooth 60 and the cross-head 40 retains its same position relatively to the housing 26 and the spreader 18, during said normal applications of the brakes.

When the pull rod 10 moves through a greater stroke than a predetermined stroke, due to slack in the rigging, or to wear in the brake shoes, the lever 12 will have an abnormal stroke which will cause the fulcrum pin 56 to withdraw the adjusting piston rod 35 to a position shown in Fig. 5, which will allow the adjusting pawl 61 to engage a new tooth 60 of the rack on the adjusting piston rod 35, thereby locating said rod 35 in a new position and also the fulcrum pin 56 in a new position relatively to the housing, so that upon the return movement of the lever 12, to release the brakes, the lever will rotate about fulcrum pin 56 and cause the cross-head to withdraw the holding piston rod 34 until the holding pawl 48 engages a new tooth 47, as shown in Fig. 6, thereby increasing the effective length of the spreader and eliminating any slack in the rigging.

Should there be sufficient slack in the rigging to cause the adjusting rod 35 to move a distance equal to two or three teeth relatively to the adjusting pawl 61, then the holding rod 34 will be moved proportionately so that the holding pawl 48 will take up the same number of teeth upon the holding rod 34. Due to the relative sizes of the teeth in the two rods 34 and 35, one rod cannot ride beyond the other, therefore an adjustment of one tooth by the adjusting pawl will adjust the holding pawl one tooth, and an adjustment of two teeth by the adjusting pawl will adjust the holding pawl two teeth, and so on until all the slack is removed from the rigging, when the ordinary strokes of the lever 12 will be resumed and the adjusting pawl 61 will then ride upon the same tooth without engaging a new tooth of the piston 35.

By providing the adjusting piston rod 35 with smaller rack teeth than the teeth upon the holding piston rod 34, the end of the lever 12, which is connected with the pull rod by the pin 13, will always return to the same position when the brakes are released, thereby insuring the pull rod 10 always being located in the full release position.

The head 55, upon the adjusting rod 35, is slidably mounted upon the top surfaces 45—45 of the upper guide bars 43—43. The head 55 is provided upon the lower portion thereof with depending flanges 80—80, which extend into the space between the two parallel bars 43—43, for freely guiding the head 55 in alignment with the length of the guides. The head 55 also has enlarged cheek lugs 81—81 which extend over and rest upon the top surfaces 45—45 of the top guide bars 43—43. Said cheek lugs 81—81 form the head 55 into a locking wedge for securing the parts of the adjusting device against accidental movement when the brakes are in release position.

Figs. 1 and 6 show the parts in brake release position, and also show the lugs 81—81 locked in frictional engagement with the top surfaces of the guide bars 43—43, by the position of the lever 12. The weight of the lever 12, when in the release position of the brakes, tends to force the cross-head 40 upwardly against the lower surfaces of the bars 43—43. The fulcrum pin 56 engages the head 55 at the lower limit of the slots 58 and thereby wedges the head 55 upon the top surfaces of the guides 43—43, so that the parts cannot move relatively to each other except when the lever 12 is moved in the direction of the arrow Fig. 1, by the pull rod 10, for applying the brakes.

The top surfaces 45—45 of the guide bars 43—43 are inclined, as shown in Figs. 1, 5 and 6. The bushing 31 is recessed for the adjusting rod 35 so that the latter is inclined relatively to the length of the housing and parallel with the inclined surfaces 45—45 of the bars 43—43. By this arrangement, as the cross-head 40 is adjusted to various positions throughout the length of the guide slot 42, such as the position shown in dot and dash lines in Fig. 1, the lever 12 will be inclined at a smaller angle relatively to the length of the spreader 18, or to a line extending through the center of the cross-head 40 and the center of the pivot pin 19 for the dead lever 14. The inclined surfaces 45—45 of the bars 43—43 insures the wedge formed by the head 55 to exactly fill the space between the fulcrum pin 56 and the top inclined surfaces of the guide bars 43—43, as shown by the two positions of the lever 12 and the head 55 in Fig. 1. Thus at any position of the head 55 throughout the length of the guide bars 43—43, the head 55 will form a wedge, or fulcrum block, upon which the lever 12 will be supported when in brake release position and thus lock the parts against accidental movement relatively to the spreader.

The inclined surfaces 45—45 of the guide bars insure the return of the end of the lever 12 carrying the pin 13, to the normal release position regardless of the position of the cross-head 40 relatively to the length of the slot in the guide, thereby insuring the proper clearance of the brake shoes.

By my novel adjusting device the pull rod 10 and the end of lever 12 carrying the pin 13 can always return to the normal position when the brakes are released, thereby eliminating the buckling of the pull rod 10 when in full release position.

The above described means for locking the lever 12 in brake release position also controls the position of the brake shoes, relatively to the wheels, when the lever 12 is in brake release position, and insures a uniform clearance between the brake shoes and the wheels when the brakes are released.

Various changes in the construction and arrangement of the parts may be made without departing from my invention.

I claim:

1. A slack adjuster for brake rigging for railway cars comprising a lever having a normal stroke for the operation of the brakes, a spreader operatively associated with the brakes, a pair of piston rods slidably mounted upon the spreader and adapted to be extended beyond one end of the latter, adjusting means associated with each rod and the spreader and adapted for inependently holding said rods against movement in one direction relatively to the length of the spreader, a cross-head pivotally connecting the lever and one of said rods, a fulcrum pin pivotally connecting the lever with the other of said rods and adapted for alternately moving said rods relatively to the length of the spreader upon abnormal strokes of the lever for taking up slack in the rigging, and a guide bar upon the spreader and located between said rods and forming a stop support for the lever when in brake release position.

2. A slack adjuster for brake rigging for railway cars comprising a lever having a normal stroke for the operation of the brakes, a spreader operatively associated with the brakes, a pair of piston rods slidably mounted upon the spreader and adapted to be extended beyond one end of the latter, adjusting means associated with each rod and the spreader adapted for indepenently holding said rods against movement in one direction relatively to the length of the spreader, a cross-head pivotally connecting the lever and one of said rods, a fulcrum pin pivotally connecting the lever with the other of said rods and adapted to alternately moving said rods relatively to the length of the spreader upon abnormal strokes of the lever for taking up slack in the rigging, a guide bar upon the spreader and located between said rods, and means associated with said fulcrum pin and adapted to engage said bar betwen said means and said cross-head for locking said rods when in release position.

3. A slack adjuster for brake rigging for railway cars comprising a lever having a normal stroke for the operation of the brakes, wheels upon the car, brake shoes, a spreader associated with the lever and the shoes for applying the shoes to the wheels, a pair of piston rods mounted upon the spreader and adapted to be extended beyond one end of the latter, adjusting means associated with each rod and the spreader and adapted for independently holding said rods against movement in one direction relatively to the length of the spreader, a cross-head pivotally connecting the lever and one of said rods, a fulcrum pin pivotally connecting the lever with the other of said rods and adapted for alternately moving said rods relatively to the length of the spreader upon abnormal strokes of the lever, and a guide bar upon the spreader and located between said rods and forming a stop support for the lever when in brake release position and for limiting the clearance between the brake shoes and the face of the wheels when in release position.

4. A slack adjuster for brake rigging for railway cars comprising a lever having a normal stroke for the operation of the brakes, a spreader operatively associated with the brakes, a holding piston rod, an adjusting piston rod, a housing upon the spreader upon which said rods are slidably mounted for extension beyond the housing, a guide bar upon the housing and located between said rods, a cross-head pivotally connecting the lever with said holding rod and slidably mounted upon the guide bar, a fulcrum pin pivotally connecting the lever with said adjusting rod, said fulcrum pin positioned upon the lever for movement with the lever through an arc having the cross-head as a center and adapted to impinge the guide bar between the cross-head and said adjusting rod when the lever is inclined relatively to the length of the guide bar and in brake release position, and adjusting means associated with each of said rods and the housing and adapted for increasing the effective length of the spreader upon abnormal strokes of the lever.

5. A slack adjuster for brake rigging for railway cars comprising a lever having a normal stroke for the operation of the brakes, a spreader operatively associated with the brakes, a holding piston rod, an adjusting piston rod, a housing upon the spreader upon which said rods are slidably mounted for extension beyond the housing, a guide bar upon the housing and located between said rods, a cross-head pivotally connecting the lever with said holding rod and slidably mounted upon the guide bar, a bearing head upon said adjusting rod and slidably mounted upon the opposite side of the guide bar relatively to the cross-head, a fulcrum pin pivotally connecting the lever with said bearing head, said fulcrum pin positioned upon the lever for locking said adjusting rod relatively to the guide bar when the lever is inclined relatively to the guide bar and in brake release position, and adjusting means associated with each of said rods and the housing and adapted for increasing the effective length of the spreader upon abnormal strokes of the lever.

6. A slack adjuster for brake rigging for railway cars comprising a lever having a normal stroke for the operation of the brakes, a spreader operatively associated with the brakes, a holding piston rod, an adjusting piston rod, a housing upon the spreader upon which said rods are slidably mounted for extension beyond the housing, a guide bar upon the housing and located between said rods, a cross-head pivotally connecting the lever with said holding rod and slidably mounted upon the guide bar, a fulcrum pin positioned upon the lever for movement with the lever about the cross-head as a center, a bearing head upon said adjusting rod, said head having an elongated slot formed therein and extending at approximately right angles to the length of the spreader, said fulcrum pin occupying said slot and adapted to engage said head between the fulcrum pin and the guide bar and form a stop support for the lever when in brake release position, and adjusting means associated with said rods and the housing adapted for increasing the effective length of the spreader upon abnormal strokes of the lever.

7. A slack adjuster for brake rigging comprising a pull rod having a fixed brake release position, a lever, a pivot pin connecting one end of the lever with said rod, a spreader, a guide bar upon the spreader, a cross-head upon the opposite end of the lever and movable relatively to the length of the guide bar, a holding rod slidably mounted upon the spreader and pivotally associated with the cross-head, means for extending the holding rod relatively to the spreader for taking up slack in the rigging by advancing the cross-head along the guide bar, a fulcrum pin upon the lever, a fulcrum head movable by the fulcrum pin along said guide bar, said guide bar having a bearing surface upon which said head is slidably supported, said bearing surface positioned at an oblique angle relatively to the longitudinal axis of said holding rod for maintaining a uniform arc between the lever and said bearing surface when the lever is in brake release position throughout the different adjusted positions of the cross-head upon the guide bar, and said fulcrum head forming a stop adapted to be impinged between the fulcrum pin and said bearing surface when in brake release position.

8. A slack adjuster for brake rigging for railway cars comprising a lever having a normal stroke for the operation of the brakes, a spreader operatively associated with the brakes, a holding piston rod, an adjusting piston rod, a housing upon the spreader upon which said rods are slidably mounted for extension beyond the housing, a guide bar upon the housing and located between the portions of said rods extending beyond the housing, said rods having their longitudinal axes inclined relatively to each other and converging beyond the housing, said guide bar having bearing surfaces extending parallel with the respective axis of each rod, means pivotally connecting the lever with each rod for reciprocating the rods and adapted for locking the rods relatively to the guide bar when the lever is in brake release position, and adjusting means associated with each rod and the housing and adapted for increasing the effective length of the spreader upon abnormal strokes of the lever.

9. A slack adjuster for brake rigging for railway cars comprising a lever having a normal stroke for the operation of the brakes, a spreader operatively associated with the brakes, a housing upon the spreader, a holding piston rod slidably mounted upon the housing in a line parallel with the length of the spreader, a cross-head pivotally connecting the lever with said rod, a guide upon the housing and having an elongated slot occupied by the cross-head, an adjusting piston rod slidably mounted upon the housing in a line inclined obliquely to the holding rod, a bearing head upon the adjusting rod, a fulcrum pin pivotally connecting the lever with said head, a guide bar having a bearing surface extending parallel with the adjusting rod and upon which surface said head is adapted to be locked by the lever when in brake release position, said head having an elongated slot adapted to permit the fulcrum pin to move with the lever to brake applying position, and adjusting means associated with each rod and the housing and adapted for increasing the effective length of the spreader upon abnormal strokes of the lever.

10. A slack adjuster for brake rigging for railway cars comprising a lever having a normal stroke for the operation of the brakes, a spreader operatively associated with the brakes, a housing upon the spreader, a pair of pawls located within the housing, means engaged by the pawls adapted for adjustably connecting the spreader with the lever and adapted for automatically taking up slack in the rigging upon an abnormal stroke of the lever, a pin rotatably mounted upon the housing and upon which pin said pawls are rotatably mounted for normal operation, cooperating means upon the pin and said pawls adapted for simultaneously disengaging the pawls from said first named means by the rotation of said pin, and means upon said pin and located without the housing adapted for rotating the pin.

11. A slack adjuster for brake rigging for railway cars comprising a lever having a normal stroke for the operation of the brakes, a spreader operatively associated with the brakes, a holding piston rod slidably mounted upon the spreader and having one end thereof projecting beyond the latter, a cross-head pivotally connecting said end of the rod with the lever, rack teeth upon said rod, a pin rotatably mounted upon the spreader, a pawl pivotally mounted upon the pin and adapted for engagement with said teeth, an adjusting piston rod slidably mounted upon the spreader, a fulcrum pin pivotally connecting one end of the adjusting rod with the lever, rack teeth upon said adjusting rod, a second pawl rotatably mounted upon said pin and adapted for engagement with the teeth upon the adjusting rod, said pawls adapted for advancing said rods relatively to the spreader upon an abnormal stroke of the lever, and cooperating parts upon said pin and said pawls adapted to be engaged by the rotation of said pin for disengaging the pawls from said rods.

THOMAS JAMES, Jr.